(12) United States Patent
Palese

(10) Patent No.: US 6,580,540 B1
(45) Date of Patent: Jun. 17, 2003

(54) TIME COMPENSATION ARCHITECTURES FOR CONTROLLING TIMING OF OPTICAL SIGNALS

(75) Inventor: Stephen P. Palese, Torrance, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 35 days.

(21) Appl. No.: 09/587,126

(22) Filed: Jun. 2, 2000

(51) Int. Cl.$^7$ ............................................. H04J 14/08
(52) U.S. Cl. ...................... 359/140; 359/115; 359/123; 359/135; 359/238; 359/240; 359/241; 385/1; 385/2; 385/3
(58) Field of Search .................. 385/17, 127, 1, 385/2, 3; 359/123, 135, 140, 189, 190, 191, 192, 238, 240, 241, 244, 245; 250/201.1, 205, 206, 208.3, 227.12, 227.21, 578.1; 372/6

(56) References Cited

U.S. PATENT DOCUMENTS

| | | | | |
|---|---|---|---|---|
| 5,109,449 A | * | 4/1992 | Newberg et al. | 385/2 |
| 5,196,714 A | * | 3/1993 | Garcia, Jr. et al. | 250/561 |
| 5,365,358 A | * | 11/1994 | Stein | 359/135 |
| 5,392,377 A | * | 2/1995 | Auracher | 385/24 |
| 5,930,038 A | * | 7/1999 | Swan | 359/484 |

* cited by examiner

Primary Examiner—Audrey Chang
Assistant Examiner—Denise S. Allen
(74) Attorney, Agent, or Firm—Robert W. Keller

(57) ABSTRACT

A time compensation architecture for use with a plurality of optical signals is disclosed. It comprises means for receiving the plurality of optical signals, optical means for selectively delaying the propagation of each of the plurality of optical signals, and means for outputting the time delayed optical signals. The delay may be achieved by changing the indices of refraction or the material lengths of the elements and can either be an active or a passive compensation technique.

4 Claims, 8 Drawing Sheets

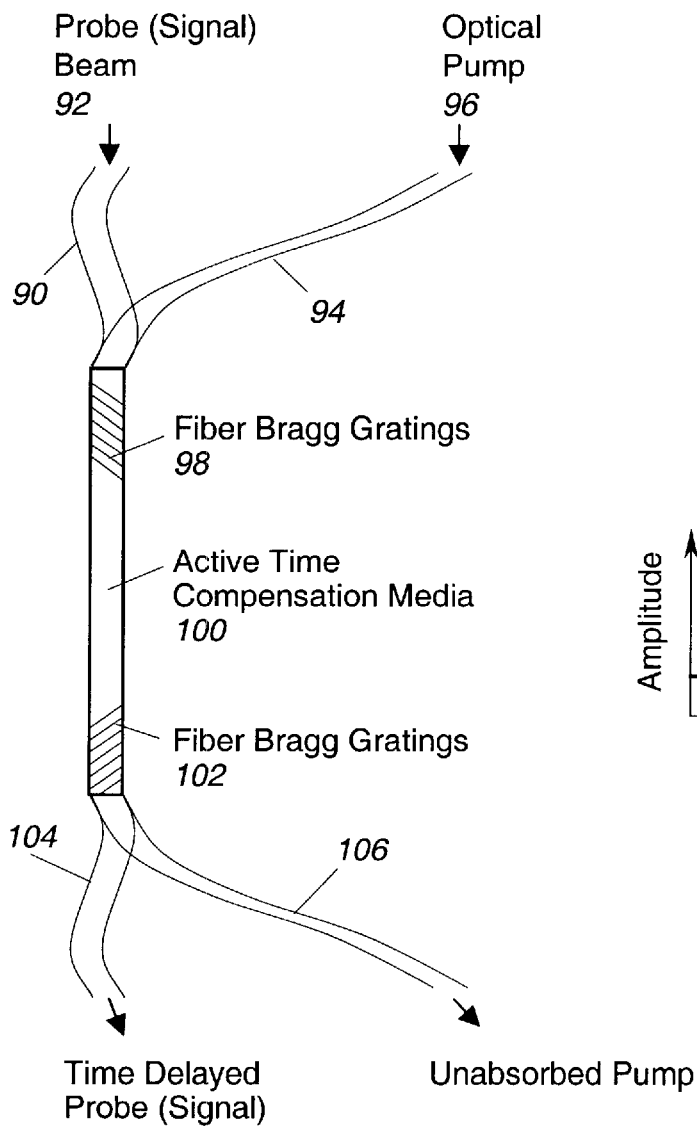
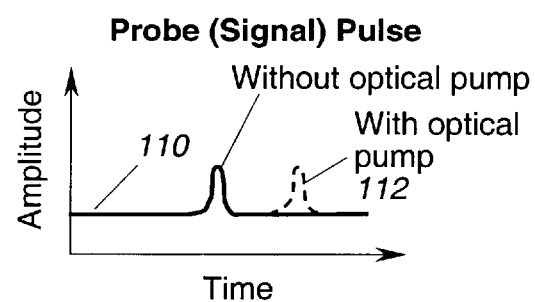
FIG. 8
FIG. 7

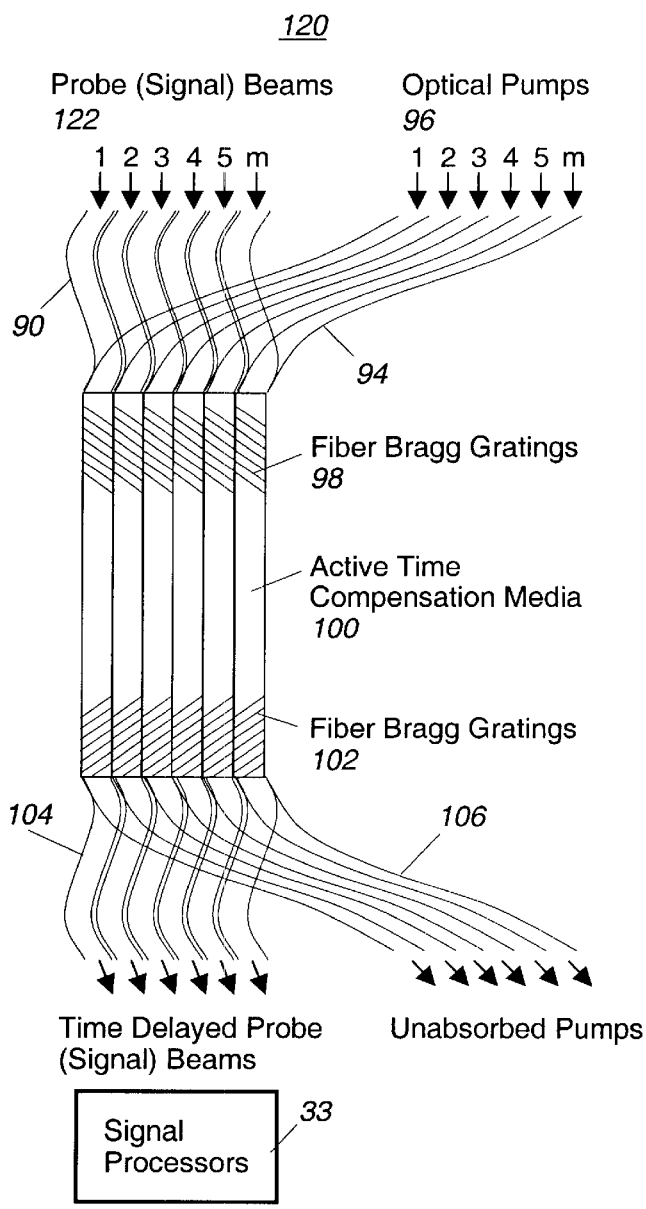
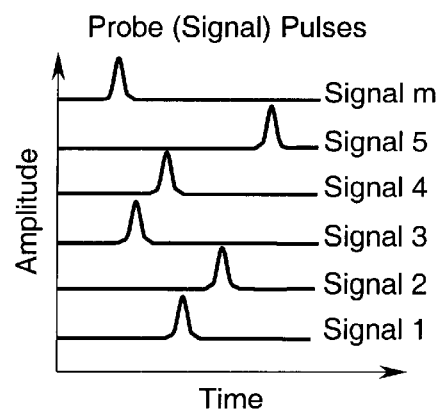
FIG. 10
FIG. 9

TIME COMPENSATION ARCHITECTURES FOR CONTROLLING TIMING OF OPTICAL SIGNALS

CROSS-REFERENCE TO RELATED APPLICATION

The present application is related to co-pending U.S. patent application Ser. No. 09/587,124, filed concurrently herewith, entitled: "Optoelectronic Communication System in Turbulent Medium Having Array of Photodetectors and Time Compensation" by Stephen Palese, assigned to the same assignee as this present invention, and its contents are Incorporated herein by reference.

Also related to co-pending U.S. patent application Ser. No. 09/586,513, filed concurrently herewith, entitled: "Optical Communication System Using Optical Transcription Material" by Stephen Palese, assigned to the same assignee as this present Invention, and its contents are incorporated herein by reference.

Also related to co-pending U.S. patent application Ser. No. 09/586,014, filed concurrently herewith, entitled: "Electro-Optic Device For Adding/Subtracting Optical Signals" by Stephen Palese, assigned to the same assignee as this present invention, and its contents are incorporated herein by reference.

Also related to U.S. patent application Ser. No. 09/587,125, now U.S. Pat. No. 6,516,103, filed concurrently herewith, entitled: "Optical Interconnect Capable of Performing Addition/Subtraction" by Stephen Palese, assigned to the same assignee as this present invention, and its contents are incorporated herein by reference.

BACKGROUND OF THE INVENTION

1. Field of the Invention

The present invention relates generally to architectures for optical signals, and more particularly to time compensation architectures for controlling timing of optical and optoelectronic signals.

2. Description of the Art

The telecommunications industry is rapidly switching from electronic systems to hybrid platforms which utilize both electronics and photonics to increase the operational bandwidth. Today's electronic communication systems consist of electrical networks, microwave amplifiers, microwave transmitters, and high speed semiconductor receivers. There are numerous electrical devices available so this architecture works well in the confines of electronics. In these electronic systems a passive technique to control timing (e.g., phasing) of signals currently utilizes an electronic stripline with an impedance load. This technique is limited because the intrinsic dispersion associated with the stripline broadens short electrical pulses that are less than 10 ps in duration. This broadening will ultimately limit the speed of the host system. Eventually as optical systems come into use, purely optical signal processing devices will be required.

What is needed, therefore, is a time compensation architecture employing optical devices as a controllable delay.

SUMMARY OF THE INVENTION

The present invention involves a time compensation architecture employing an optical device as a controllable delay.

The optical time compensation architecture utilizes the material index of refraction, n, and material lengths to control the relative timing of optical signals. The optical delay through the media can be described by $$t = n*l/c$$

where t is the time delay, n is the index of refraction, l is the material length, and c is the speed of light. The relative timing ($\Delta t_{12}$) of two signals can be controlled by either changing the indices of refraction ($n_1$, $n_2$), or the material lengths ($l_1$, $l_2$), or both. It follows that $$\Delta t_{12} = (n_1 * l_1 - n_2 * l_2)/c.$$

Of course this technique is extendable to a plurality of delays where the index of refraction and/or the material length is controllable for each individual signal.

While passive compensation techniques have a large number of applications, active control of relative signal timing may be necessary for real time signal processing. Active techniques to control the time or phase delay of an optical beam in fiber optical systems currently include piezo-electric fiber stretching, electro-optic phase modulators, and current injection in semiconductor waveguides. These techniques suffer from slow time response (typically 10 KHz), inability to produce large temporal delays (typically 20 femtoseconds), and the inability to produce precise controllable delays, respectively.

These deficiencies can be overcome by using optically pumped photoactive systems such as doped fibers, and semiconductor or polymer waveguides where the amplitude of the pump laser alters the index of refraction of the material at the signal wavelength. In this case the dynamic timing change ($\delta T$) is given by $$\delta T = \delta n * l/c$$

where $\delta n$ is the pump induced index change.

Index of refraction changes producing hundreds of picosecond delays with sub femtosecond resolution are realizable in such optically pumped systems. In addition, index of refraction changes based on ground and/or excited state absorption processes or nonlinear optical interactions can ultimately produce control frequencies in excess of 1 THz.

Briefly, the present invention comprises time compensation architecture for use with a plurality of optical signals. It comprises means for receiving the plurality of optical signals, optical means for selectively delaying the propagation of each of the plurality of optical signals, and means for outputting the time delayed optical signals. The delay may be achieved by changing the indices of refraction or the material lengths of the elements and can either be an active or a passive compensation technique.

The foregoing and additional features and advantages of this invention will become apparent from the detailed description and accompanying drawing figures below. In the figures and the written description, numerals indicate the various elements of the invention, like numerals referring to like elements throughout both the drawing figures and the written description.

BRIEF DESCRIPTION OF THE DRAWINGS

FIG. 7 diagrammatically illustrates two optical fibers arranged in an active time compensation architecture in accordance with the present invention.

FIG. 8 illustrates the waveform of the probe pulse used in FIG. 7.

FIG. 9 illustrates another embodiment of the active time compensation system employing a plurality of signal beams and optical pumps in accordance with the present invention.

FIG. 10 illustrates the waveforms for the signal beams of FIG. 9.

DETAILED DESCRIPTION OF THE PREFERRED EMBODIMENTS

Figure 1:
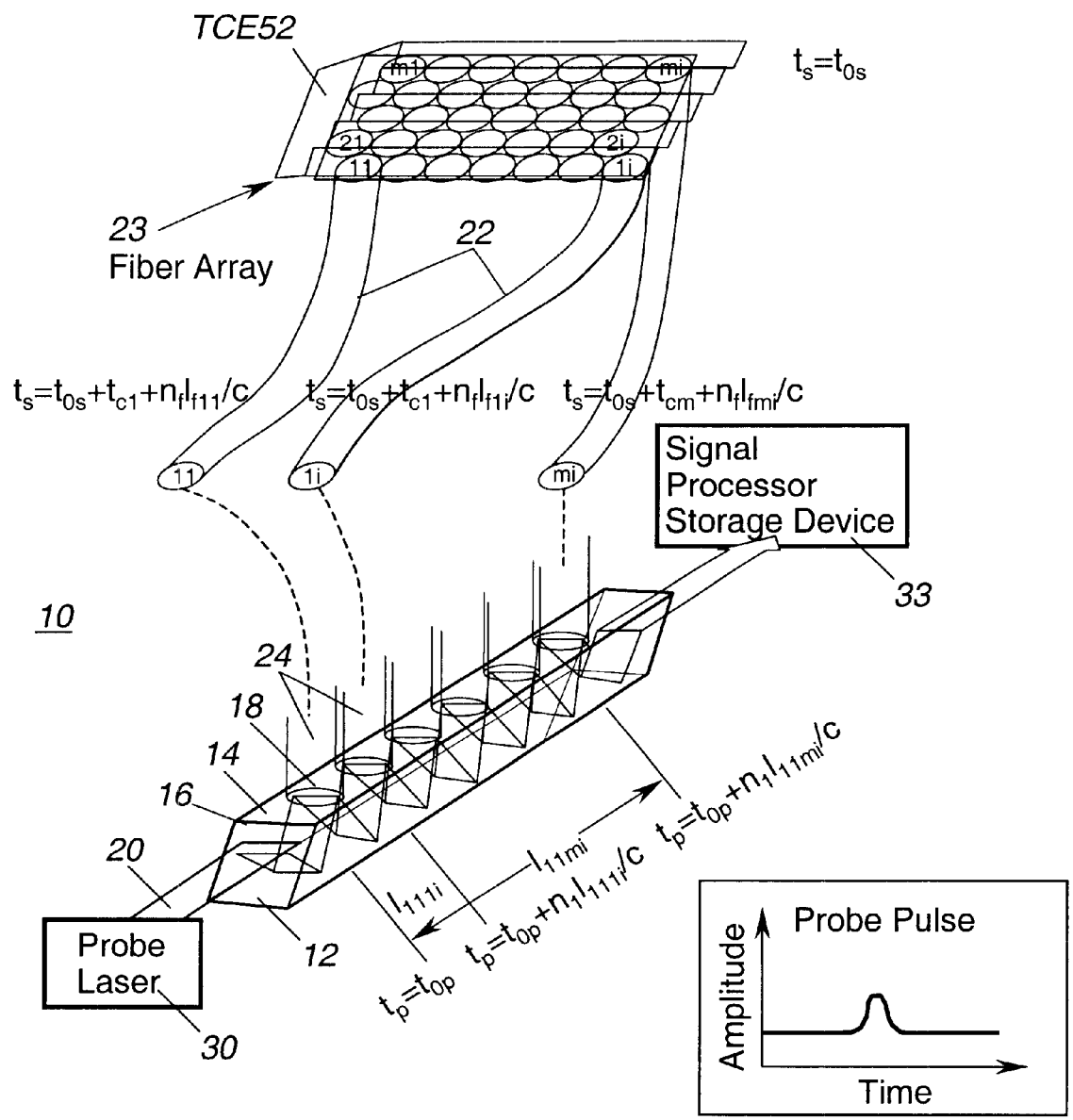
FIG. 1 is a diagram illustrating a waveguide optical interconnect with time compensation for use with a serial reading technique in accordance with the present invention.

As illustrated in the diagram of FIG. 1, the present invention provides an optical device or interconnect with time compensation, generally designated by the numeral 10. Briefly, the optical interconnect 10 comprises a waveguide optical interconnect 12 that is characterized by generally total internal reflection (TIR). More particularly, the optical waveguide 12, also referred to as a TIR device, includes a layer 14 of an optical transcription material (OTM) over a top surface 16. The thickness of the waveguide is selected such that certain modes of a probe beam hit the interaction areas 18 of the OTM 14 when a probe beam 20 is applied to an input port and propagated through the waveguide. Optical fibers 22 configured in an array 23 propagate signal beams 24 to the interaction areas 18. The optical fibers 22 extend from the signal fiber array 23 having m×i fibers. A signal processor 33 serves to process, manipulate, display, and store the output signals developed by the optical interconnect. The signal processor includes a storage device which is preferably a device manufactured by Templex Incorporated.

A probe laser 30 transmits the probe beam 20 through an optical fiber to the input port of the optical waveguide 12. The probe beam is diffraction limited or near diffraction limited, may be characterized as having a Gaussian or Bessel waveform, and has a power in the microwatt range. This power is significantly lower than that of the signal beams 24.

The OTM element 14 is formed of a photoactive material, such as a polymer film that has a fast response (both rise time and recover time) to the optical signal beam. It interacts with a preselected frequency and has an index of retraction, n, that varies over time when it is probed with the probe beam. It serves to impart an additional phase shift amplitude modulation or polarization rotation to the probe upon photo-excitation of the OTM. Alternatively, it can be a wafer formed of a semiconductor material, such as silicon or gallium arsenide, that is sensitive to infrared radiation, other polymers (undoped or doped with donor or acceptor molecules), molecular crystals, biological and synthetic chromophore systems, or a superconductive material.

At the OTM 14 the signal beams 24 interact with the near diffraction limited probe beam 20 through a linear or non-linear optical process and impresses a modulation onto the probe beam through index of refraction variations in the OTM. Through this signal-probe mechanism, information which is encoded onto the signal beam is transcribed into modulation of the probe beam.

More particularly, the evanescent wave of the probe beam 20 penetrates into the OTM at the interaction areas 18 and introduces either an amplitude or phase change on the probe in response to the index of refraction change, $\Delta n$, induced by the signal beam.

This optical interconnect is based on amplitude or phase variations which can be induced at TIR interaction surfaces 18. The exponentially damped evanescent wave exists at a TIR interface and therefore can monitor index of refraction changes which occur on the other side of the boundary. This mechanism forms the basis for many chemical and biological fiber sensors. In these representations, the OTM 14 must be physically close to the TIR surface 16, respectively, such that the probe evanescent field penetrates into the interaction region 18 which is optically excited by the signal beams 24. This TIR surface can reside in a bulk optic or an optical waveguide.

The critical angle, $\theta c$, for the TIR is $$\theta_c = \sin^{-1}\left(\frac{n_1}{n_2}\right)$$

Where $n_1$ and $n_2$ are the index of refraction of the two mediums comprising the waveguide 12 and the OTM 14, respectively.

The fiber optic array 23 is constructed such that each of the individual fibers 22 transmit the signal onto one site of the optical interconnect device which is coated with the OTM 14. The index of refraction variations of the optical transcription are material induced by the signal (pump) beam 24, and are translated into either amplitude or phase modulation of the probe. Polarization rotation of the probe can be accomplished by differential phase modulation along orthogonal OTM directions. If the index change at the probe wavelength is large enough that the critical angle requirement is no longer met by the probe, then a portion of the beam will be transmitted through the boundary layer and amplitude modulation will result. Phase modulation occurs if the index variation on the OTM is such that the requirement for critical angle at the TIR interface is still satisfied by the probe beam. This change $\Delta\phi$ can be expressed as $$\Delta\phi = \frac{1}{n_1}\frac{\partial\phi}{\partial n}\Delta n_2$$

where $n_1$ is the index of the TIR optic or waveguide and $n_2$ is the index of the optical transcription material. For the two cases where the electric field is either perpendicular or parallel to the plane of incidence $$\frac{\partial\phi_\perp}{\partial n} = -\sin\phi_\perp\left(\frac{n}{\sin^2\theta - n^2}\right)$$

$$\frac{\partial\phi_\parallel}{\partial n} = -\sin\phi_\parallel\left(\frac{n}{\sin^2\theta - n^2} + \frac{2}{n}\right)$$

For a typical TIR optical interconnect θ=55°, $n_1$=1.8 and $n_2$=1.3 the phase shifts are approximately $$\partial\phi\perp \approx 4.4\Delta n_2$$

$$\partial\phi\| \approx 7.6\Delta n_2$$

for parallel and perpendicular electric fields respectively. The probe cumulative phase change through the TIR optic would add in a root mean squared manner (100 bounces will induce 10 times the phase shift) unless the signal and probe beams are optically phase locked.

The TIR based interconnect approach employs a time compensated reading methodology which provides a means for correcting optical delays which occur in a serial reading beam architecture due to the time required for the probe beam to propagate. The probe optical beam has a propagation time of nd/c, where n is the material index of refraction, d is the distance and c is the speed of light. For a large array this propagation delay can seriously degrade the receiver temporal response. For example, a thousand element fiber array of 100 μm diameter fibers would take 600 ps to read. With a time compensated architecture the arrival of the signal beam at the transcription site is made to be synchronous with the arrival of the reading (probe) beam so that propagation delays do not accumulate. This is accomplished by inserting an equivalent (compensating) optical delay in a prescribed manner into the signal beam.

FIG. 1 shows a one dimensional time compensation system for a serial reading device. A collected optical signal arrives at a time compensation element (TCE) 52. The TCE 52 comprises an optical wedge or diffractive optic of the kind that is commercially available from several optical device manufacturers. The optical wedge is configured as an m×i matrix. As the TCE 52 lies in front of the optical fiber array 23. The optical signal at time $t_s=t_{os}$, transmits through the TCE 52 and propagates to the interaction area 18 at the end of the fiber at time $$t_s = t_{os} + t_{cm} + n_f d_{fmi}/c$$

where $t_{cm}$ is the time delay in row m of the TCE 52, $n_f$ is the index of retraction of the optical fiber 22, $d_{fmi}$ is the length of the optical fiber in row m and column i, and c is the speed of light.

If the fibers 22 are the same length and no time compensation element is included, then the probe beam 20 and signal beam 24 accumulate a temporal error equal to $n_1 d_{11mi}/c$ which degrades the array's temporal resolution. The time compensation optical element 52 with $t_{cm} = n_1 d_{m1mi}/c$ serves to synchronize the probe beam 20 and the optical signal beam 24 at a point in each row of the array so that the temporal degradation is reduced.

Thus, each row is compensated. More particularly, the center element in each row is synchronized with the probe beam 20. Note the other elements in each row are not synchronized. Thus, this technique has some temporal resolution error associated with it, which would be analogous to time jitter. For a square fiber bundle 23, the one dimensional time compensation scheme allows the number of fibers to be squared (i.e., 10 fibers becomes 100 fibers) with the same temporal resolution (frequency bandwidth).

Figure 2:
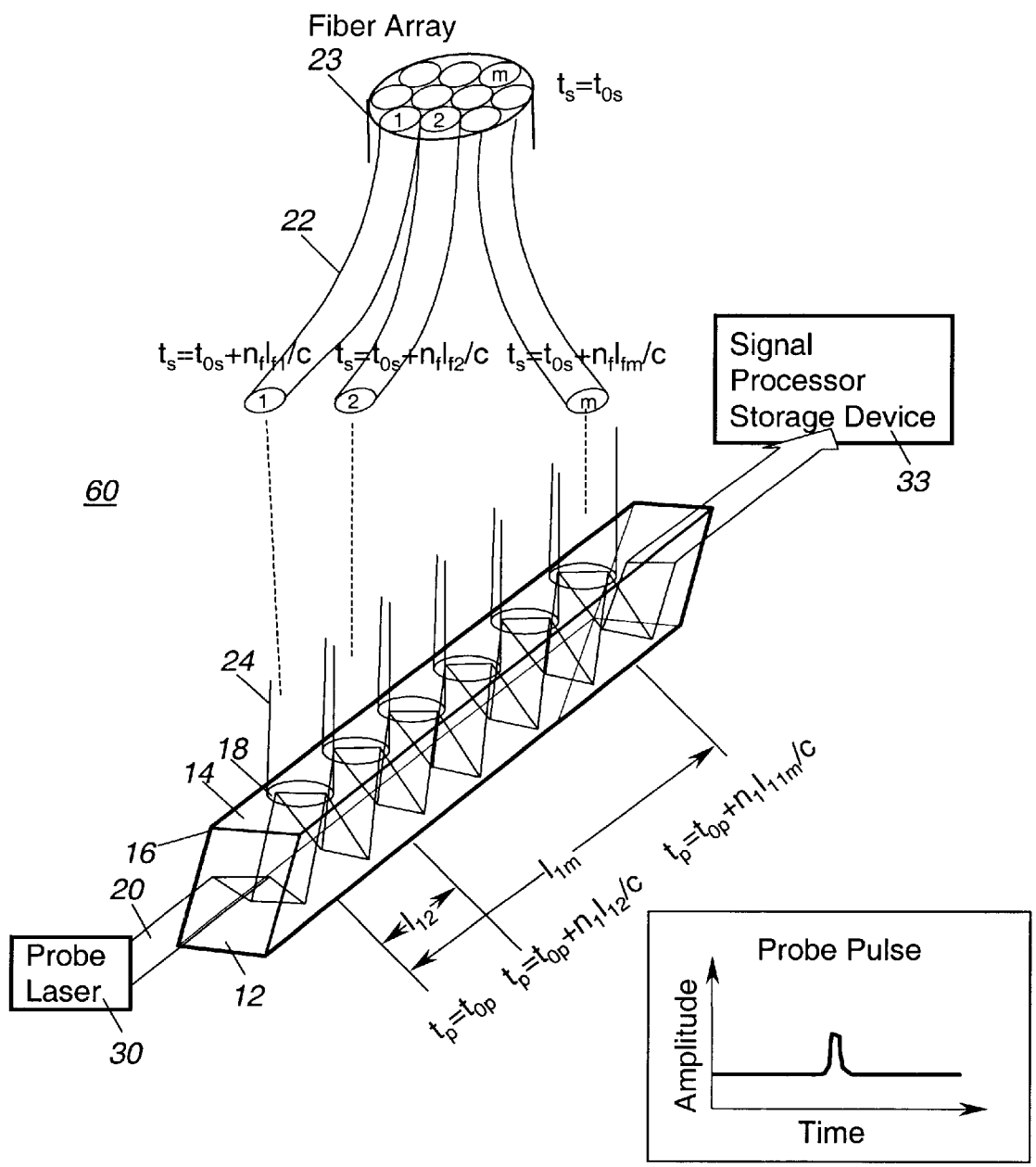
FIG. 2 is a diagram of another embodiment of a waveguide optical interconnect configured to provide two dimensional time compensation in accordance with the present invention.

FIG. 2 shows an element by element time compensation architecture, generally designated by the numeral 60. Many of the parts of the system 50 are identical in construction to like parts in the interconnect illustrated in FIG. 1 described above, and accordingly, there have been applied to each part of the architecture in FIG. 2 a reference numeral corresponding to the reference numeral that was applied to the like part of the apparatus described above and shown in FIG. 1. The optical signal beam arrives at the fiber array 23 at time $t_s=t_{os}$ and propagates to the interaction area 18 at the end of the fiber at time $$t_s = t_{os} + n_f d_{fm}/c$$

where $n_f$ is the index of refraction of the fiber 22, $d_{fm}$ is the length of fiber m, and c is the speed of light.

If the fibers 22 are the same length and no time compensation element is included, then the probe beam 20 and signal beam 24 accumulate a temporal error equal to $n_1 d_{1m}/c$ which degrades the array's temporal resolution. As, however, in accordance with this invention the fiber lengths are tailored such that $n_f(d_{fm}-d_{f1})=n_1 d_{1m}$ the probe and signal beam are synchronized at each point in the array. Thus, this embodiment does not degrade the optical reading of the probe beam.

Figure 3:
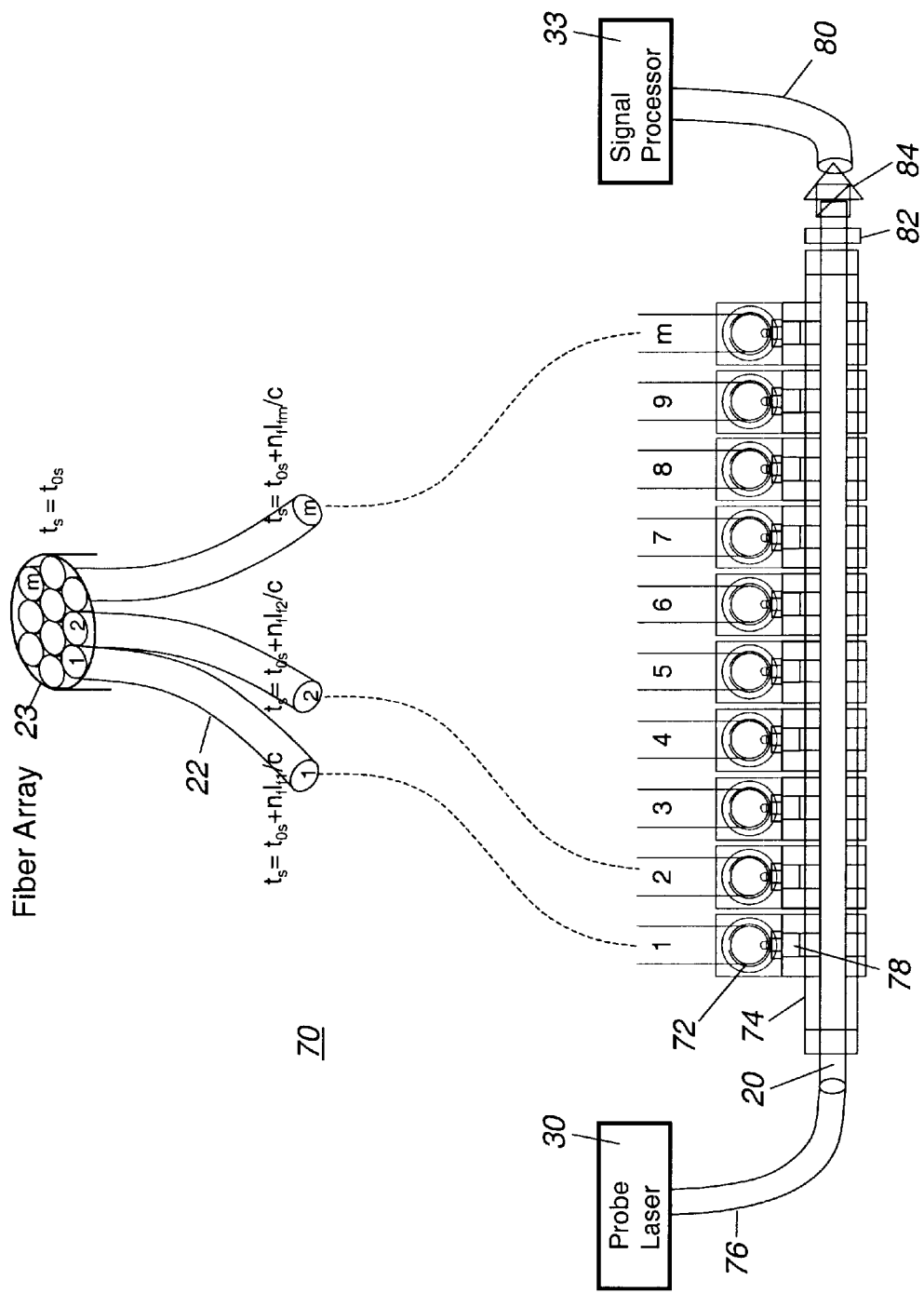
FIG. 3 is a diagram illustrating another embodiment of an optical interconnect configured with a time compensation architecture in accordance with the present invention.

Referring now to FIG. 3, an alternative embodiment of the electro-optic interconnect with time compensation, generally designated by the numeral 70, is shown.

Many of the parts of the optical device 70 including the time compensation architecture, are identical in construction to like parts of the interconnect illustrated in FIG. 2. Accordingly, there has been applied to each part of the device 70 a reference numeral corresponding to the reference numeral that was applied to a like part of the interconnect described above. The fundamental difference is that a photodetector array converts the optical signals into electrical signals for subsequent processing.

More particularly, the electro-optic interconnect 70 comprises a plurality of small area high speed photodetector 72 that convert an optical signal having a magnitude depending upon the amount of light incident on it. The photodetectors 72 are arranged in an array matching the number of optical fibers in the fiber array.

Alternatively, the detector may be a photocathode microchannel, a superconducting detector or any other photoactivated compound device.

An electro-optic crystal 74 or waveguide extends longitudinally in an orientation orthogonal to the detectors 72. The crystal 74 is formed from a electro-optic material (for example $LiTaO_3$, $LiNiO_3$, GaAs, or birefringent polymers), with birefringent axis properly oriented with respect to the electric field and the optical probe beam 20. A probe laser 30 generates the probe beam, or reading beam, longitudinally through a single mode optical fiber 76 and the crystal 74. The probe beam is preferably a continuous wave beam or mode-locked pulse train to provide real time signal processing. A microwave stripline 78 formed on a nonconducting substrate extends perpendicularly to and supports the crystal 74 and propagates the electrical signal developed by the photodetector 72 to interact with the optical probe beam 20. The stripline 78 is terminated in a 50 ohm load to prevent reflections from propagating back down the stripline which would degrade the temporal resolution. The substrate is connected to the ground to prevent noise or extraneous signals from interfering with the electric signal on stripline 78.

More particularly, the electrical signal carried by the stripline 78 generates an electric field that penetrates into the underside of the electro-optic crystal 74 inducing a time dependent polarization rotation or phase change on the probe beam 20. This change varies with the electric field strength and therefore with the intensity of the light incident on the photodetector. The rotation depends on the crystal axis orientation relative to the electric field created by the stripline signal.

Each signal from the photodetectors 72 contributes to the total polarization rotation of the probe beam 20. These additive or subtractive changes are converted to an amplitude modulated signal on the fiber 80 with a $\lambda/2$ waveplate 82 and a polarizer 84. The $\lambda/2$ waveplate 82 can be adjusted to either homodyne or heterodyne the response. In heterodyne operation, the waveplate 82 is adjusted to allow some of the unmodulated probe beam to pass through the waveplate. This sets up a local field that mixes with the signal and is used for linear operation.

The polarizer 84 converts the polarization rotation induced on the probe beam 20 to a time dependent amplitude modulation. For homodyne operation the waveplate 82 is adjusted and the polarizer 84 is crossed so no light leaks through when there is no voltage developed ona photodetector 72. For both heterodyne and homodyne operation, the polarizer 84 analyzes changes in the phase and polarization of the probe beam 20 produced by the electro-optic effect. A probe high speed photodetector in the signal processor 33 converts the amplitude modulated probe beam into a resultant electrical signal. Each of the signal photodetectors 72 contribute to the total polarization rotation of the probe beam 20.

In operation the optical fiber 22 propagates the optical signal to its optoelectronic detector 72 which converts the optical signal into an electrical signal. The electrical signal is propagated down the stripline to the 50 ohm load. The propagating electrical signal creates an electric field outside the stripline. The electric field penetrates into the surface of the electro-optic crystal 74 and induces a time dependent polarization rotation or phase change on the probe beam 20. Each detector induces a rotation or phase change corresponding to the received optical signal carried to it by its optical fiber. The $\lambda/2$ waveplate 82 and polarizer 84 are adjusted to convert the total rotation or phase change to a resultant probe beam into a time dependent modulated optical signal. The signal processor 33 converts this into an electrical signal representative of the optical signals, and further demodulates and processes the electrical signal as desired. Alternatively, the signal processor could directly optically process the acquired signal.

Figure 4:
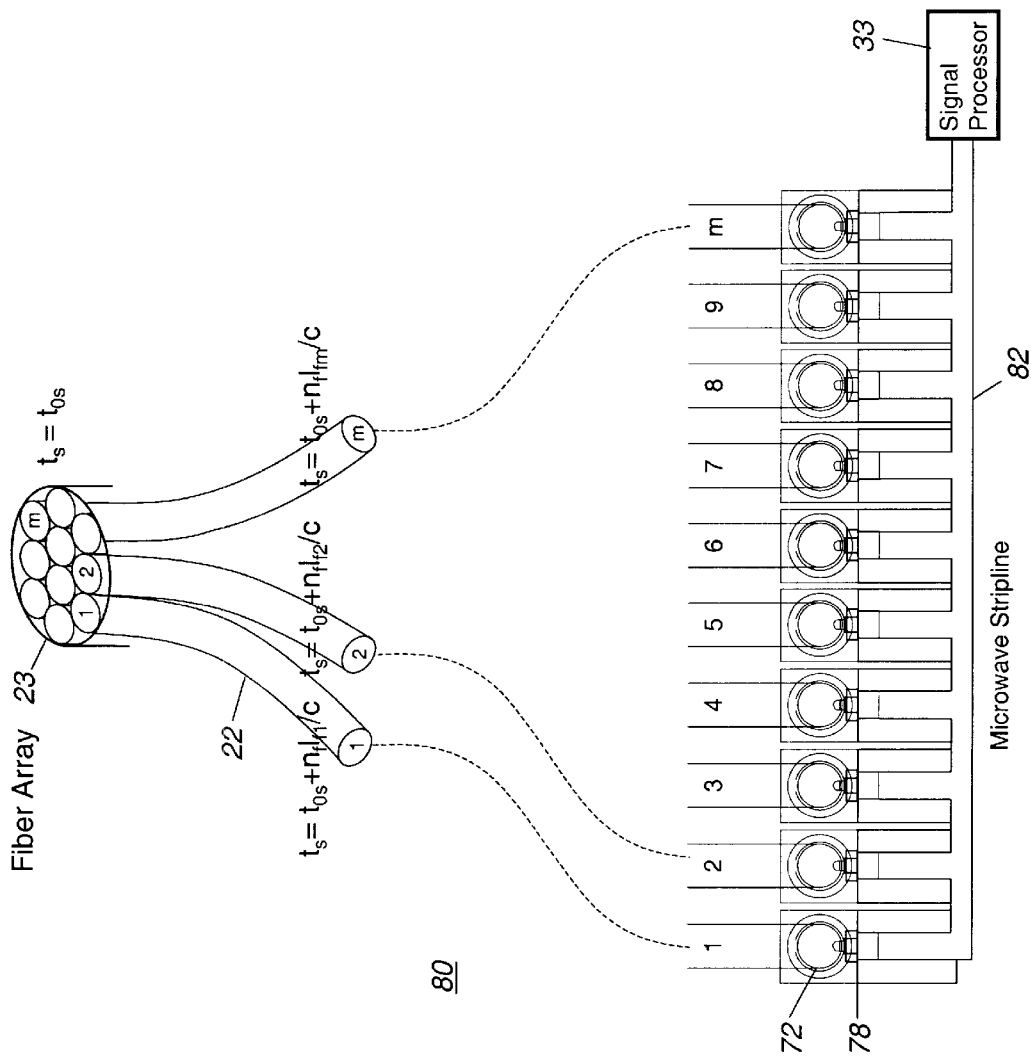
FIG. 4 diagrammatically illustrates yet another embodiment of the optical interconnect shown in FIG. 3 with an electrical signal processor.

Referring now to FIG. 4, another embodiment of the optical interconnect with time compensation, 80, is shown. Many of the elements of the interconnect 80 are identical to like parts of the interconnect 70 illustrated in FIG. 3 and like reference numerals are applied to the elements. The fundamental difference is that in this embodiment is that the electrical signal on the striplines 78 is processed without converting it back to an optical signal. Accordingly, a probe beam is not utilized. The signal processor 33 processed the sum of the time compensated electrical signals input to it from bus 82.

Figure 5:
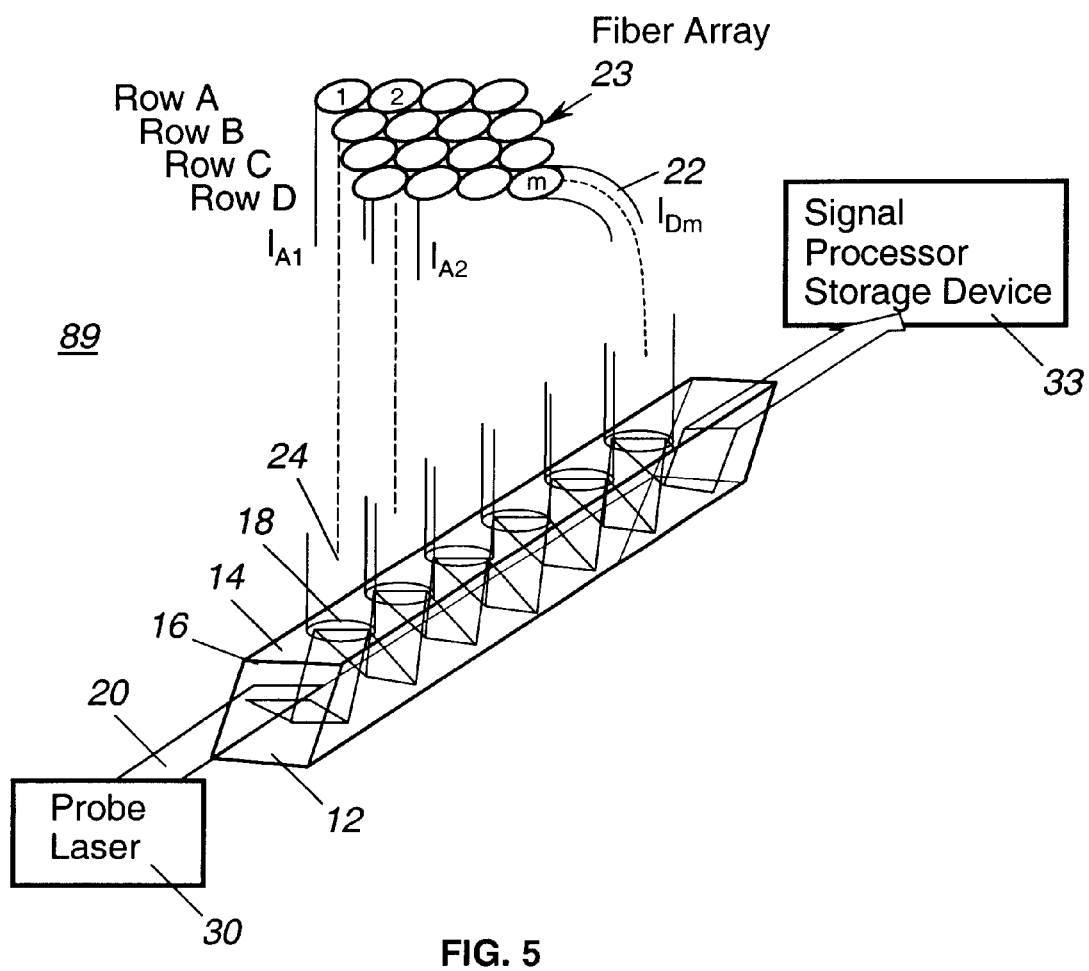
FIG. 5 is a diagram illustrating yet another embodiment of the present invention with a probe pulse sequence.
Figure 6:
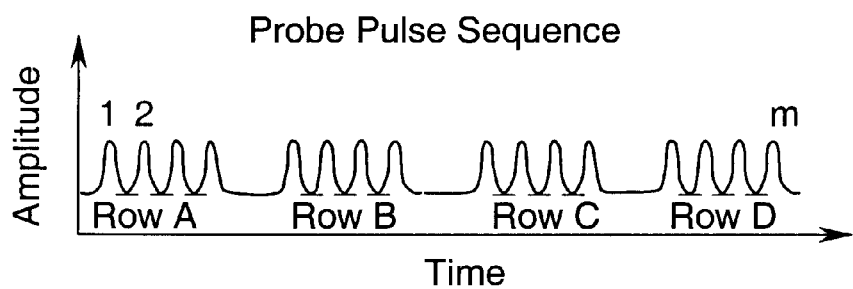
FIG. 6 shows the waveforms of the probe pulse associated with the optical interconnect illustrated in FIG. 5.

FIG. 5 depicts an embodiment 89 of the optical interconnect with time compensation, similar to the embodiment shown in FIG. 2. The fundamental difference is that the lengths of the optical fibers 22 are tailored to achieve a probe pulse sequence as shown in FIG. 6. The tailored lengths are such to provide the temporarily sequenced pulses carried sequentially in a row by row manner (see Rows A, B, C and D). It should be recognized that the individual pulses produced are not synchronized. This type of configuration is useful for signal processing of images and the like.

Active time compensation architectures are shown and described in FIGS. 7 through 12. With reference first to FIG. 7, a single optical fiber 90 carries a probe beam 92, also referred to as a signal beam. The fiber 90 is preferably a doped fiber, although it may be a semiconductor waveguide or polymer waveguide. It is characterized as having an index of refraction, n, that varies with the magnitude of the pump. The fiber 90 is connected to optical fiber 94 propagating an optical pump 96 by a fiber Bragg grating 98. The pumped signal beam has its changed index of refraction and propagates through an active time compensation media 100. The changed index of refraction causes a changed time delay in its propagation. The length of the media 100 and change in index of refraction is selected to provide the desired time delay. After the preselected length, the Bragg grating 102 separates the time delayed probe (signal) on fiber 104. The unabsorbed pump is exhausted via fiber 106. Typically, almost 99% of the pump is absorbed and only about 1% is unused and hence, exhausted out of the system. FIG. 8 illustrates the waveform of the probe (signal) pulse. The graph 110 shows the probe without optical pumping. The dashed lines 112 show the delay introduced by the optical pump.

Another embodiment of the active time compensation architecture is shown in FIG. 9 and generally designated by the numeral 120. The architecture is similar to the architecture shown in FIG. 7. The fundamental difference is that a plurality of probe (signal) beams and a like plurality of optical pumps are employed. The probe beams 122 are comprised in an array of dimension m. Each beam is pumped by a corresponding optical pump 96. The length of the active time compensation media 100 and change in index of refraction is tailored for each probe beam. The resultant time delayed probe beams 104 are shown in FIG. 10, with each probe beam occurring at a different time.

Figures 11, 12:
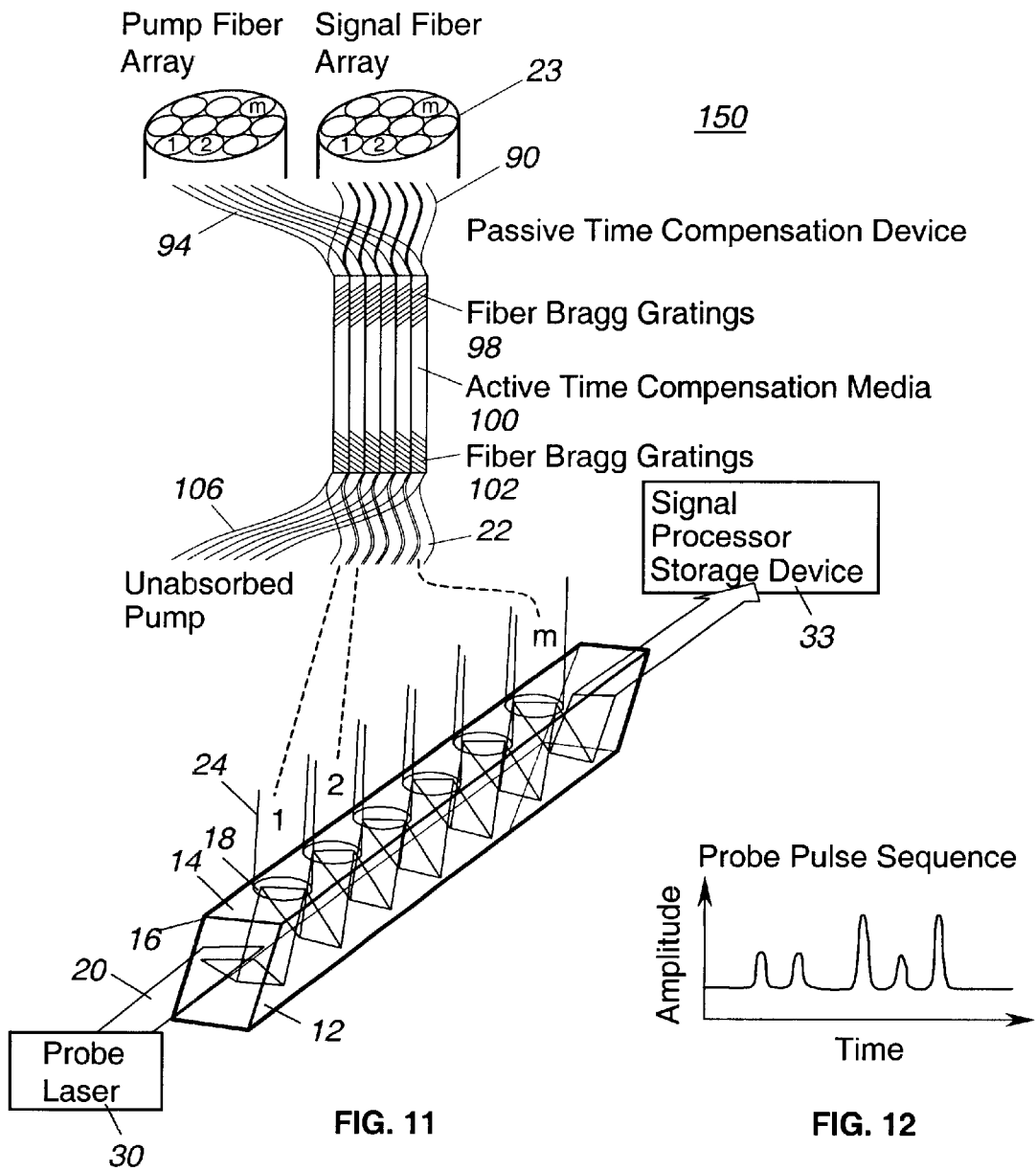
FIG. 11 illustrates a combined passive and active time compensation system in accordance with the present invention.
FIG. 12 illustrates the waveform of the probe pulses associated with the system of FIG. 11.

FIG. 11 illustrates an optical interconnect with a time compensation architecture 150 that combines a passive time compensation architecture as shown in FIG. 1 and an active time compensation architecture as shown in FIG. 9. This embodiment produces a probe pulse sequence as shown in FIG. 12. It should be recognized that the active time compensation media could be chosen to have the probe pulses be synchronized, such that a single resultant additive pulse is produced.

Obviously, many modifications and variations of the present invention are possible in light of the above teachings. Thus, it is to be understood that, within the scope of the appended claims, the invention may be practices otherwise than as specifically described above.

What is claimed and desired to be secured by Letters Patent of the United States is:

1. A time compensation architecture for use with a plurality of optical signals, comprising:

means for receiving a plurality of optical signals;

means for selectively delaying the propagation of each of the plurality of optical signals, wherein the means for selectively delaying comprises a plurality of optical fibers arranged in a matrix;

means for outputting the time delayed optical signals; and an optical waveguide having a layer of optical transcription material (OTM) disposed over a surface and serving to receive the optical signals at spaced-apart interaction locations on said OTM, and means for providing a probe beam for propagating through said optical waveguide, said probe beam interacting with said optical signals at each said interaction region.

2. A time compensation architecture for use with a plurality of optical signals, comprising:

means for receiving a plurality of optical signals;

means for selectively delaying the propagation of each of the plurality of optical signals, wherein the means for selectively delaying comprises a plurality of optical fibers, each of which has a length tailored to provide a preselected delay;

means for outputting the time delayed optical signals; and an electro-optical crystal, means for propagating a probe beam through said electro-optical crystal and an array of photodetector means, each responsive to a delayed optical pulse and operative to convert the delayed optical signal into a sum signal that modulates the probe beam.

3. An optical propagation time compensation architecture, comprising:

a plurality of input ports arrayed in a matrix, for receiving an equal plurality of optical signals;

an equal plurality of optical output ports;

an equal plurality of optical fibers for coupling the optical signals from the input ports to the respective output ports; and means for selectively delaying the optical signals between the input ports and the output ports to ensure that the optical signals arrive at the output ports in a desired time relationship;

wherein the optical fibers are doped in selected regions to provide active time compensation media;

and wherein the means for selectively delaying the optical signals further comprises an optical pump for pumping the doped optical fiber regions and creating selectable time delays.

4. An optical propagation time compensation architecture, comprising:

a plurality of input ports arrayed in a matrix, for receiving an equal plurality of optical signals;

an equal plurality of optical output ports;

an equal plurality of optical fibers for coupling the optical signals from the input ports to the respective output ports;

means for selectively delaying the optical signals between the input ports and the output ports to ensure that the optical signals arrive at the output ports in a desired time relationship; and a serial reading beam device coupled to the output ports, wherein a probe beam interacts successively with and is modulated by each of the optical signals, and wherein the optical signals are selectively delayed to arrive at the serial reading beam device in synchronism with propagation of the probe beam, thereby avoiding unwanted propagation delays.

* * * * *